United States Patent
Lee et al.

(10) Patent No.: US 9,409,485 B2
(45) Date of Patent: Aug. 9, 2016

(54) APPARATUS AND METHOD FOR ALLEVIATING VOLTAGE DROP OF BATTERY CELL

(71) Applicant: HYUNDAI MOTOR COMPANY, Seoul (KR)

(72) Inventors: Hee-Jin Lee, Daegu (KR); Jin-Cheol Shin, Seoul (KR); Yong-Chan Kim, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/546,813

(22) Filed: Nov. 18, 2014

(65) Prior Publication Data

US 2016/0009184 A1    Jan. 14, 2016

(30) Foreign Application Priority Data

Jul. 14, 2014  (KR) .................. 10-2014-0088406

(51) Int. Cl.
| | |
|---|---|
| *H02P 1/00* | (2006.01) |
| *B60K 6/20* | (2007.10) |
| *B60L 11/00* | (2006.01) |
| *B60L 11/12* | (2006.01) |
| *B60L 11/18* | (2006.01) |
| *H02J 7/00* | (2006.01) |
| *H02P 29/00* | (2016.01) |

(52) U.S. Cl.
CPC ............. *B60L 11/12* (2013.01); *B60L 11/1861* (2013.01); *H02J 7/007* (2013.01); *H02P 29/00* (2013.01)

(58) Field of Classification Search
CPC .......... B60W 2510/244; B60W 2710/083; B60W 2710/0644; B60W 2510/0638; B60W 2710/105; B60W 2510/0676; B60W 2510/0657; B60W 2510/246; B60W 2710/086; B60W 2510/083; B60W 2510/085; B60W 2710/0677; B60W 2510/087; B60W 2710/246
See application file for complete search history.

(56) References Cited

U.S. PATENT DOCUMENTS

| | | | | |
|---|---|---|---|---|
| 8,751,087 | B1* | 6/2014 | Dufford ............. | B60W 20/108 180/65.23 |
| 2002/0062183 | A1* | 5/2002 | Yamaguchi .............. | B60K 6/46 701/22 |
| 2009/0114463 | A1* | 5/2009 | DeVault ................. | B60K 6/365 180/65.29 |
| 2012/0239236 | A1* | 9/2012 | Eom ....................... | B60L 11/18 701/22 |
| 2013/0134915 | A1* | 5/2013 | Chung .................... | H02P 29/02 318/400.14 |
| 2013/0181516 | A1* | 7/2013 | Phan .................... | B60L 11/1868 307/10.7 |
| 2015/0336558 | A1* | 11/2015 | Yamazaki .............. | B60K 6/442 701/22 |

FOREIGN PATENT DOCUMENTS

| | | |
|---|---|---|
| JP | 2001-112110 A | 4/2001 |
| JP | 2004-248408 A | 9/2004 |
| JP | 2008-189090 A | 8/2008 |
| JP | 2010-137783 A | 6/2010 |

(Continued)

*Primary Examiner* — Marlon Fletcher
(74) *Attorney, Agent, or Firm* — McDermott Will & Emery LLP (57) ABSTRACT

An apparatus for alleviating a voltage drop of a battery cell includes a battery having a plurality of battery cells, a sensor configured to sense the battery to generate sensing information, a calculator configured to calculate an allowable torque of a motor using the sensing information and calculate an expected voltage of the battery using the allowable torque and the sensing information, and a determinator configured to control a torque quantity of the motor using the expected voltage and a reference voltage.

15 Claims, 9 Drawing Sheets

(56) References Cited

FOREIGN PATENT DOCUMENTS

| KR | 10-2011-0048859 A | 5/2011 |
| KR | 10-2011-0109433 A | 10/2011 |
| KR | 10-2013-0046946 A | 5/2013 |
| KR | 10-2014-0079156 A | 6/2014 |

* cited by examiner

APPARATUS AND METHOD FOR ALLEVIATING VOLTAGE DROP OF BATTERY CELL

CROSS-REFERENCE TO RELATED APPLICATION

This application claims the benefit of priority to Korean Patent Application No. 10-2014-0088406 filed on Jul. 14, 2014, the entire contents of which are incorporated herein by reference.

TECHNICAL FIELD

The present disclosure relates to a battery management technology, and more particularly, to an apparatus and a method for alleviating a voltage drop of a battery cell capable of stabilizing a voltage of the battery which is suddenly reduced by controlling a torque used in a motor depending on a state of charge (SOC) and temperature.

BACKGROUND

An example of various types of eco-friendly vehicles which are now being developed and are attracting attention may be an electric vehicle.

The electric vehicle is driven by charging and discharging energy of a battery pack. Therefore, the electric vehicle may have more excellent fuel efficiency and more reduce pollutants than a vehicle using only an engine and therefore has received a positive consumer response. Therefore, a battery which is a core component of the electric vehicle has been more intensively researched.

As products using the battery are increased, a need exists to keep a voltage of the battery high. For this reason, the voltage of the battery is greatly reduced at a low state of charge (SOC) and a low temperature, which has a bad effect on system efficiency. In particular, the system efficiency is more affected at the low temperature at which the power output is reduced.

Generally, polyethylene(PE)-based parts set a minimum voltage from the battery as a reference voltage. In this case, it is preferable to keep the reference voltage of the PE-based parts higher.

For this reason, to prevent the voltage drop of the battery cell, a method for setting the reference voltage of the PE-based parts to the minimum voltage of the battery and increasing the reference voltage is used.

Figure 1:
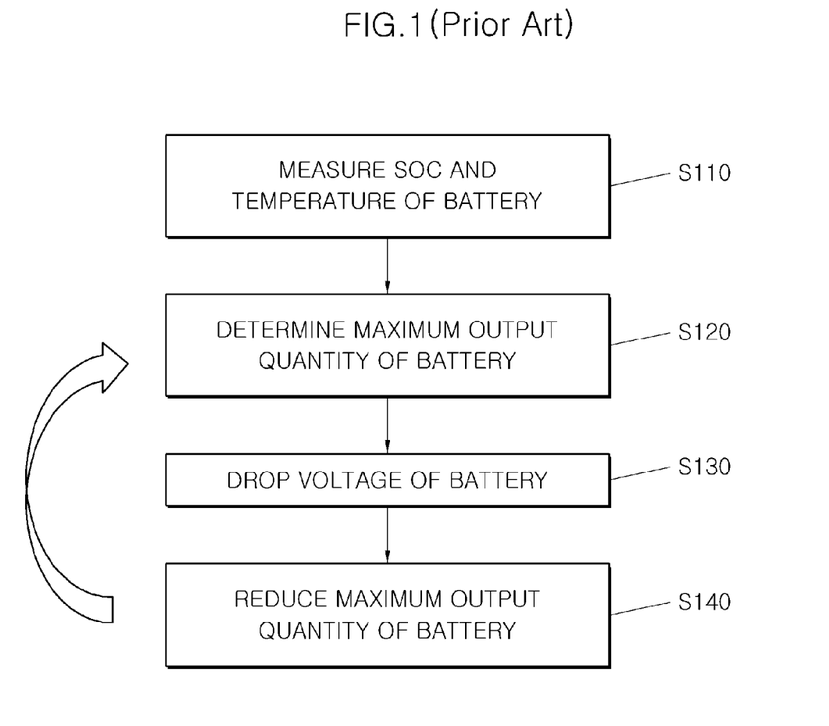
FIG. 1 is a diagram illustrating a process of reducing a maximum output quantity of a battery depending on a voltage drop of a general battery.

In this case, as illustrated in FIG. 1, the SOC and temperature of the battery are measured and a maximum output quantity of the battery is determined depending on the measured SOC and temperature of the battery (steps S110 and S120).

The voltage drop of the battery occurs depending on the maximum output quantity of the battery and the maximum output quantity of the battery is also reduced (steps S130 and S140).

Therefore, the method for increasing the reference voltage considerably disturbs the improvement in system efficiency and the reduction in weight and therefore a need exists for a method for increasing a minimum voltage.

SUMMARY

An aspect of the present inventive concept is directed to an apparatus and a method for alleviating a voltage drop of a battery cell capable of preventing a sudden voltage drop of the battery cell by increasing a minimum voltage.

Another aspect of the present inventive concept is directed to an apparatus and a method for alleviating a voltage drop of a battery cell capable of stabilizing a voltage of the battery cell by controlling a maximum motor torque at a low state of charge (SOC) and a low temperature.

Other objects and advantages of the present inventive concept can be understood by the following description, and become apparent with reference to the embodiments of the present inventive concept.

An aspect of the present inventive concept encompasses an apparatus for alleviating a voltage drop of a battery cell capable of preventing a sudden voltage drop of a battery cell by increasing a minimum voltage.

The apparatus for alleviating a voltage drop of a battery cell includes: a battery having a plurality of battery cells; a sensor sensing the battery cells to generate sensing information; a calculator calculating an allowable torque of a motor using the sensing information and calculating an expected voltage of the battery cell using the sensing information; and a determinator controlling a torque quantity of the motor using the expected voltage and a preset reference voltage.

The calculator may calculate the expected voltage using maximum allowable power of the battery cell, an allowable torque within a range of the maximum allowable power, a current voltage slope, and a change quantity of revolution per minute (RPM) of the motor.

The reference voltage may be increased by an extension of arrival time of the reference voltage to the maximum allowable power.

The current voltage slope may be calculated by a power usage of the battery at a position of a current voltage.

The change quantity of the RPM may be a change quantity of RPM to the maximum allowable power at a current point.

The expected voltage may be calculated by the following Equation.

$$\text{Expected Voltage} = \text{Current Voltage} - Dv/d\,(\text{RPM}) \times \text{Change Quantity Of RPM}$$

In the above Equation, $dV/d\,(\text{RPM})$ represents a voltage slope.

The determinator may reduce the torque quantity of the motor when the expected voltage is smaller than the reference voltage and use the torque quantity corresponding to the maximum allowable power when the expected voltage is higher than the reference voltage.

The sensing information may include a state of charge (SOC), a state of health (SOH), a temperature, and a voltage of the battery.

The maximum allowable power may be any one of 60 kW limit, 80 kW limit, and 40 kW limit.

In accordance with another aspect of the present inventive concept, a method for alleviating a voltage drop of a battery cell, including: sensing a battery having a plurality of battery cells to generate sensing information; calculating an allowable torque of a motor using the sensing information; calculating an expected voltage of the battery using the allowable torque and the sensing information; and controlling a torque quantity of the motor using the expected voltage and a preset reference voltage.

The controlling of the torque quantity may include: comparing the expected voltage with the reference voltage; as the result of the comparing, when the expected voltage is smaller than the reference voltage, reducing the torque quantity of the motor; and as the result of the comparing, when the expected voltage is higher than the reference voltage, using the torque quantity corresponding to maximum allowable power.

DETAILED DESCRIPTION

Since the present inventive concept may be variously modified and have several exemplary embodiments, specific exemplary embodiments will be shown in the accompanying drawings and be described in detail in a detailed description. However, it is to be understood that the present inventive concept is not limited to the specific exemplary embodiments, but includes all modifications, equivalents, and substitutions included in the spirit and the scope of the present inventive concept.

Throughout the accompanying drawings, the same reference numerals will be used to describe the same components.

Terms used in the specification, 'first', 'second', etc., may be used to describe various components, but the components are not to be construed as being limited to the terms. That is, the terms are used to distinguish one component from another component.

For example, the 'first' component may be named the 'second' component and the 'second' component may also be similarly named the 'first' component, without departing from the scope of the present inventive concept. The term 'and/or' includes a combination of a plurality of items or any one of a plurality of terms.

Unless indicated otherwise, it is to be understood that all the terms used in the specification including technical and scientific terms have the same meaning as those that are understood by those who skilled in the art.

It must be understood that the terms defined by the dictionary are identical with the meanings within the context of the related art, and they should not be ideally or excessively formally defined unless the context clearly dictates otherwise.

Hereinafter, an apparatus and a method for alleviating a voltage drop of a battery cell in accordance with an exemplary embodiment of the present inventive concept will be described in detail with reference to the accompanying drawings.

Figure 2:
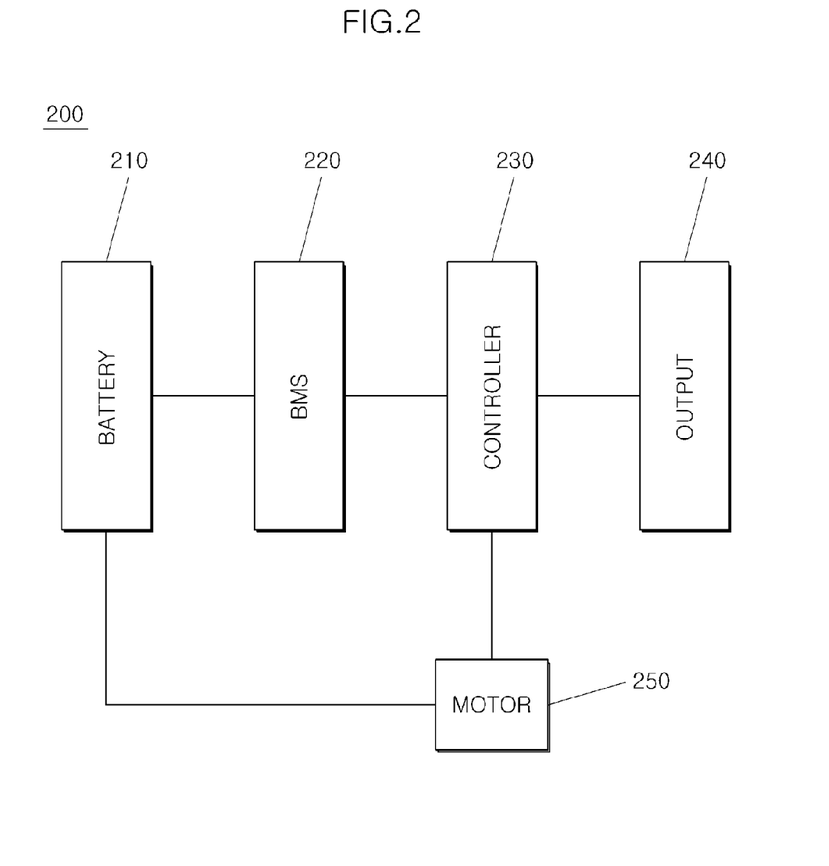
FIG. 2 is a configuration diagram of an apparatus for alleviating a voltage drop of a battery cell capable of stabilizing a voltage of the battery in accordance with the exemplary embodiment of the present inventive concept.

FIG. 2 is a configuration diagram of an apparatus 200 for alleviating a voltage drop of a battery cell capable of stabilizing a voltage of the battery in accordance with the exemplary embodiment of the present inventive concept. Referring to FIG. 2, the apparatus 200 for alleviating a voltage drop of a batter cell includes: a motor 250, a battery 210 supplying power to the motor 250, a battery management system (BMS) 220 sensing the battery 210 to generate sensing information, using the sensing information to calculate an allowable torque of the motor 250, using the allowable torque and the sensing information to calculate an expected voltage of the battery, and using the expected voltage and a reference voltage to control the torque quantity of the motor, a controller 230 controlling the BMS 220, an output unit 240 outputting information of the battery, and the like.

The battery 210 includes battery cells (not illustrated) which are configured in series and/or in parallel, in which the battery cell may be a battery for an electric vehicle such as a nickel metal battery, a lithium ion battery, and the like.

Herein, an example of the electric vehicle may include an electric vehicle (EV), a hybrid electric vehicle (HEV), a plug-in hybrid electric vehicle (PHEV), a fuel cell vehicle, and the like.

The output unit 240 displays battery information, driving information of a vehicle, and the like. The output unit 240 outputs a combination of graphics and/or characters and/or voice. To this end, the output unit 240 includes, a display system and/or an acoustic system, and the like. Components of the system may also be installed inside a vehicle cluster or outside the vehicle cluster.

The motor 250 may be a three-phase alternating induction motor, an interior permanent magnet motor, a universal motor, and the like but the present inventive concept is not limited thereto.

Further, an inverter (not illustrated) for supplying power to the motor 250 may be provided. The inverter (not illustrated) includes a plurality of power switch elements. As the power switch element, an insulated gate transistor (IGBT) has been mainly used, but the present inventive concept is not limited thereto and a metal oxide silicon field effect transistor (MOSFET) element, and the like may be used. The power MOSFET element is operated at a high voltage and a high current, and has a double-diffused oxide semiconductor (DMOS) structure unlike a general MOSFET.

The motor 250 and a circuit and/or a structure around the motor 250 are well known and therefore will no more described to clearly understand the present inventive concept.

The controller 230 transmits and receives control and/or data signals, and the like among components such as the battery 210, the BMS 220, and/or the output unit 240, and the like, and controls these components.

Figure 3:
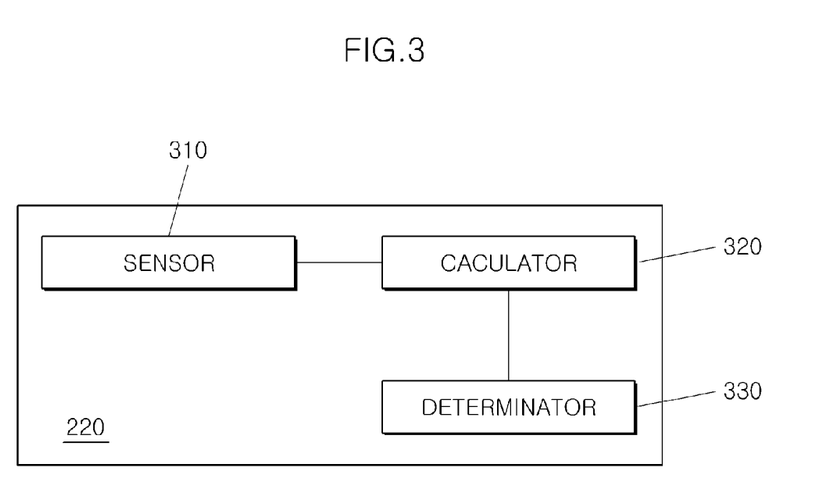
FIG. 3 is a detailed configuration diagram of a battery management system (BMS) illustrated in FIG. 2.

FIG. 3 is a detailed configuration diagram of the battery management system (BMS) 220 illustrated in FIG. 2. Referring to FIG. 3, the BMS 220 is configured to include a sensor 310 sensing the battery 210 (FIG. 2) to generate the sensing information, a calculator 320 using the sensing information to calculate an allowable torque of the motor 250 (FIG. 2) and using the allowable torque and/or the sensing information to calculate the expected voltage of the battery 210, and a determinator 330 using the expected voltage and the reference voltage to control a torque quantity of the motor 250, and the like.

The sensor 310 includes a current sensor sensing a current of the battery 210 (FIG. 2), a voltage sensor sensing a voltage of the battery 210, a power sensor sensing power of the battery 210, a temperature sensor sensing a temperature of the battery 210, and the like.

In particular, the current sensor and the voltage sensor may also sense each of the battery cells included in the battery 210 and may also sense all the batteries. Therefore, each sensor may be disposed in each battery call and one sensor may perform the sensing on all the battery cells.

Therefore, the sensor 310 may generate the sensing information, in which an example of the sensing information may include a voltage, current, power, temperature, a state of charge (SOC), a state of health (SOH), and the like.

Further, the BMS 220 and/or the controller 230 may include a storage (not illustrated). The storage (not illustrated) may be configured with a combination of a nonvolatile memory such as a hard disk drive, a flash memory, an electrically erasable programmable read-only memory (EEPROM), a static RAM (SRAM), a ferro-electric RAM (FRAM), a phase-change RAM (PRAM), and a magnetic RAM (MRAM) and/or a volatile memory such as a dynamic random access memory (DRAM), a synchronous dynamic random access memory (SDRAM), and a double data rate-SDRAM (DDR-SDRAM).

The storage (not illustrated) stores programs, data, sensing information sensed in real time, and the like, for managing the battery 210. Further, the storage (not illustrated) is stored with a program having an algorithm which uses the sensing information to calculate the allowable torque of the motor 250, uses the allowable torque and the sensing information to calculate the expected voltage of the battery, and uses the expected voltage and the reference voltage to control the torque quantity of the motor, data for driving the program, and the like.

Referring continuously to FIG. 3, the calculator 320 calculates a maximum allowable power of the battery 210, an allowable torque within the range of the maximum allowable power, a current voltage slope, and a change quantity of revolution per minute (RPM) of the motor.

The determinator 330 compares the expected voltage calculated from the calculator 320 with the preset reference voltage to control the torque quantity of the motor 250. The determinator 330 reduces the torque quantity of the motor when the expected voltage is smaller than the reference voltage. Unlike this, the determinator 330 uses the torque quantity corresponding to the maximum allowable power when the expected voltage is higher than the reference voltage.

Figure 4A:
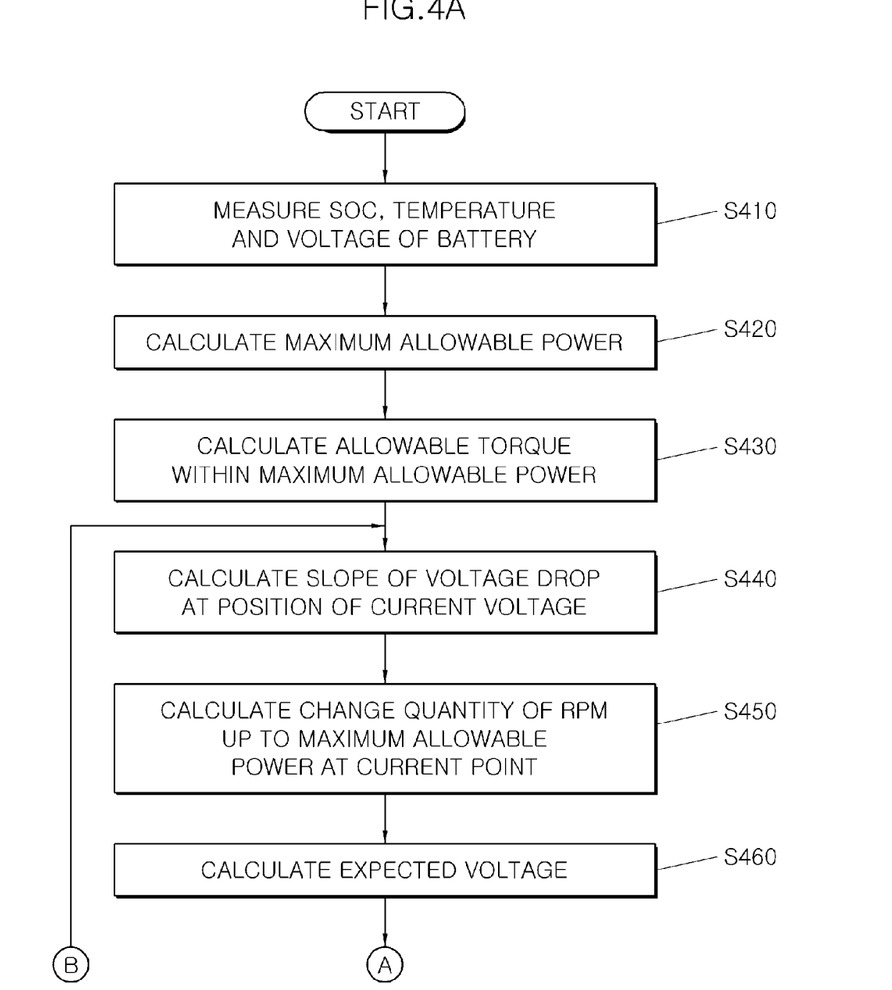
FIG. 4A and FIG. 4B are flow charts illustrating a process of stabilizing a voltage of a battery in accordance with an exemplary embodiment of the present inventive concept.
Figure 4B:
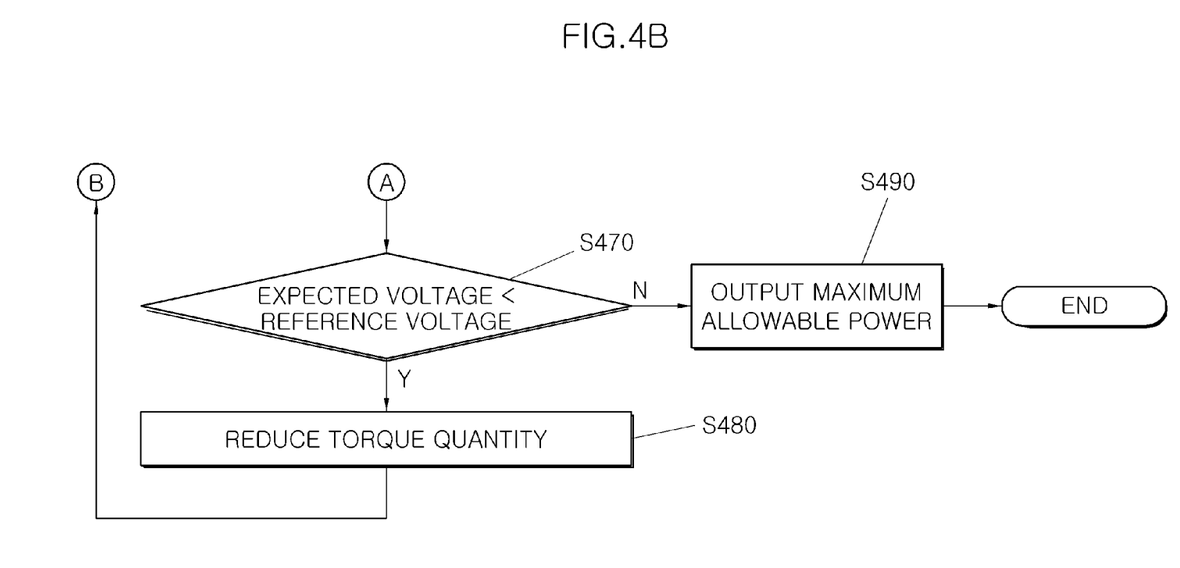

FIGS. 4A and 4B are flow charts illustrating a process of stabilizing a voltage of a battery in accordance with an exemplary embodiment of the present inventive concept. Referring to FIG. 4A, the battery 210 (FIG. 2) is sensed to generate the sensing information (step S410). An example of the sensing information may include the SOC, temperature, and voltage of the battery 210.

The maximum allowable power is calculated using the sensing information and the allowable torque of the motor 250 (FIG. 2) within the maximum allowable power is calculated (steps S420 and S430).

The voltage drop slope is obtained by the use of the battery power at the position of the current voltage and the change quantity of the RPM up to the maximum allowable power is calculated at the current time (steps S440 and S450).

Next, the expected voltage is calculated based on the measured current voltage, current voltage slope, and change quantity of the RPM (step S460). The expected voltage depending on the following Equation.

Expected Voltage=Current Voltage−Dv/d (RPM)× Change Quantity Of RPM    [Equation 1]

In the above Equation, dV/d (RPM) represents a voltage slope and the change quantity of the RPM represents a difference value between two points on an X axis.

Referring to FIG. 4 B, the expected voltage compares with the reference voltage (step S470).

When the expected voltage is smaller than the reference voltage, the torque quantity is reduced (step S480). Next, steps S430 to S470 are repeatedly performed.

Unlike this, in step S470, when the expected voltage is larger than the reference voltage, it is determined that the voltage is stabilized and thus the torque quantity corresponding to the maximum allowable power is used (step S490).

Further, the control of the torque quantity may be performed by checking whether the following events are generated.

The event may include the occurrence in change in an operation mode for a predetermined time (for example, 1 minute), an average speed (for example, about 80 kph) or less for a predetermined time, a stop time (for example, about 30 second or more) for a predetermined time.

Unlike this, the control of the torque quantity may be performed by checking whether the following events are generated.

The event may include the occurrence in change in an operation mode for a predetermined time (for example, 1 minute), an average speed (for example, about 80 kph) or more for a predetermined time, a stop time (for example, about 30 second or more) for a predetermined time.

Figure 5:
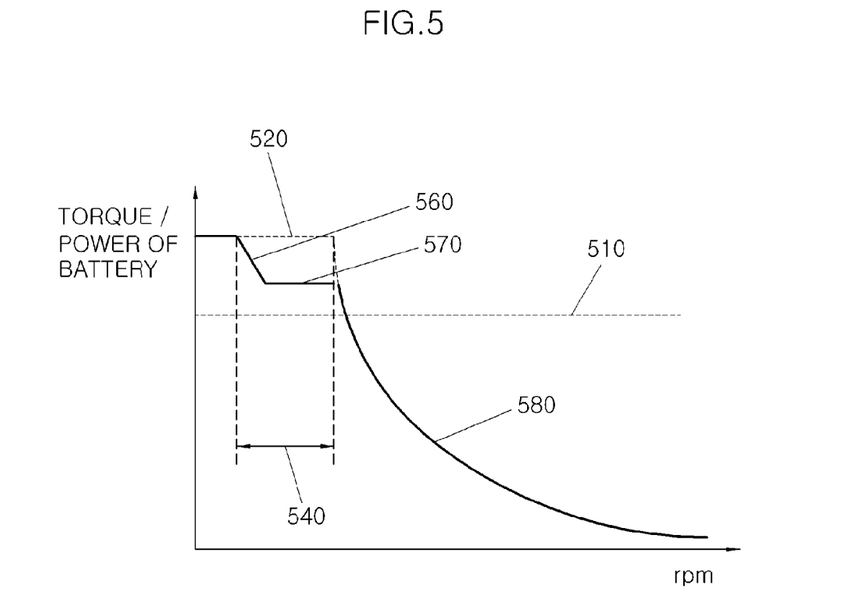
FIG. 5 is a graph illustrating a relationship of a revolution per minute (RPM) to torque/battery power in accordance with an exemplary embodiment of the present inventive concept.

FIG. 5 is a graph illustrating a relationship between a revolution per minute (RPM) and torque/battery power in accordance with an exemplary embodiment of the present inventive concept. Referring to FIG. 5, a horizontal axis represents the RPM and a vertical axis represents the torque/battery power. In the RPM and torque/battery power plane, a maximum allowable power determining line 510, a torque determining line 520, an interval 540 of the change quantity of the RPM up to the maximum allowable power, a torque reducing interval 560, a torque determining (maximum torque at which the expected voltage is larger than the reference voltage) line 570, and a torque determining line 580 at which the maximum power may be used are illustrated.

Figure 6:
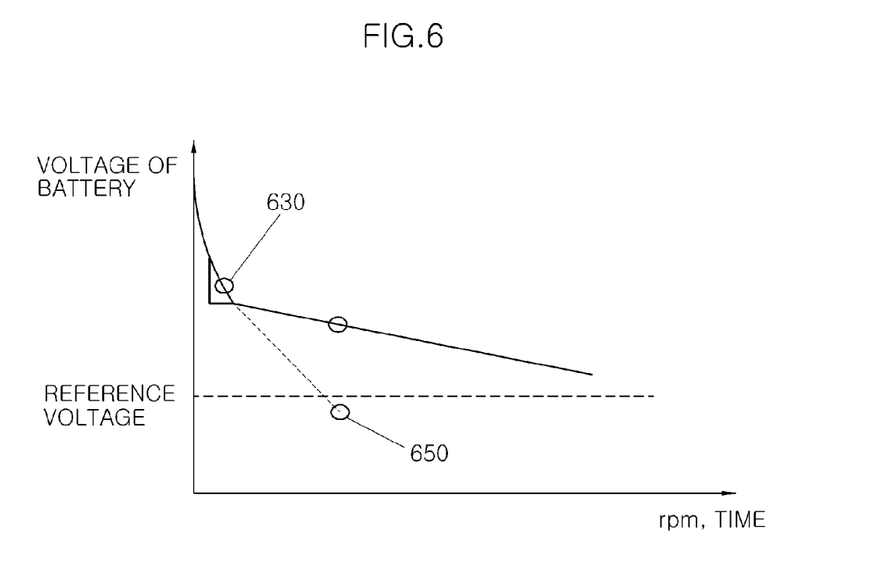
FIG. 6 is a graph illustrating a relationship of RPM time to reference voltage and voltage of a battery in accordance with an exemplary embodiment of the present inventive concept.

FIG. 6 is a graph illustrating a relationship between an RPM time to reference voltage and a voltage of a battery in accordance with an exemplary embodiment of the present inventive concept. Referring to FIG. 6, a voltage drop slope measuring point 630 and an expected voltage point 650 are illustrated. The expected voltage point 650 is obtained using the voltage slope and the current voltage.

Figure 7:
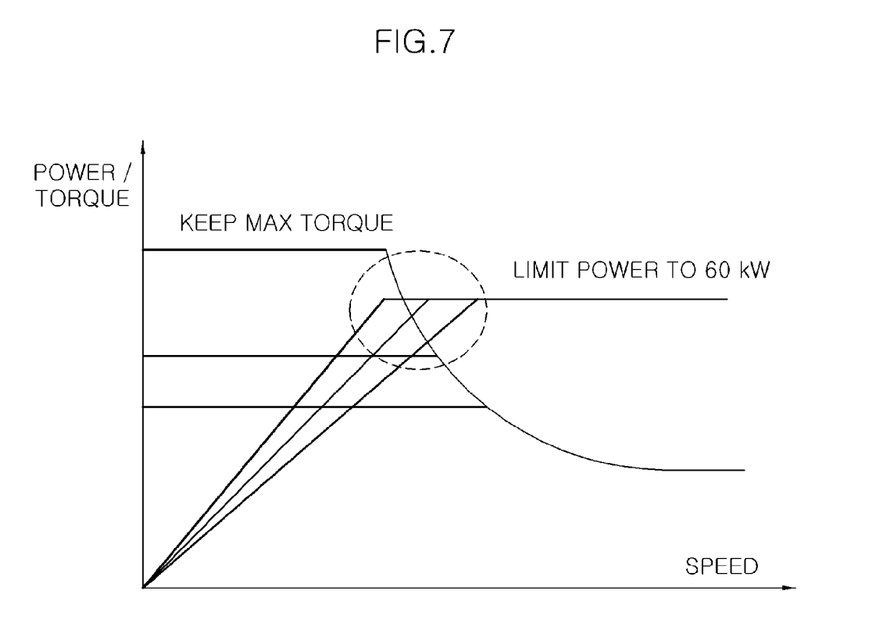
FIGS. 7 to 9 are graphs illustrating a concept controlling a voltage drop quantity using a maximum torque variable and a power limiting variable in accordance with an exemplary embodiment of the present inventive concept.
Figure 8:
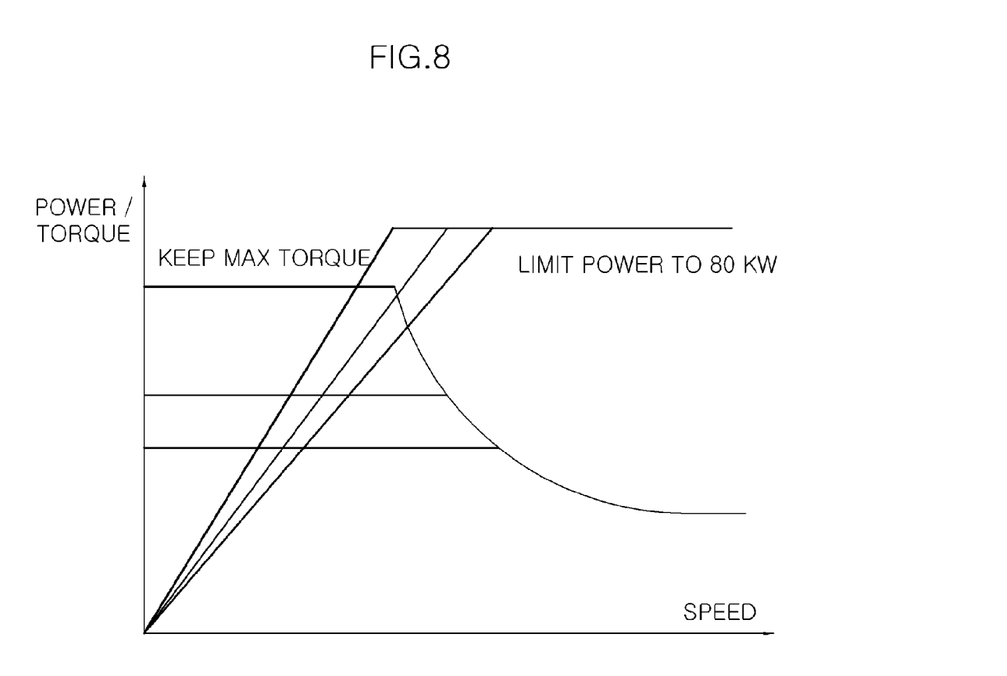
Figure 9:
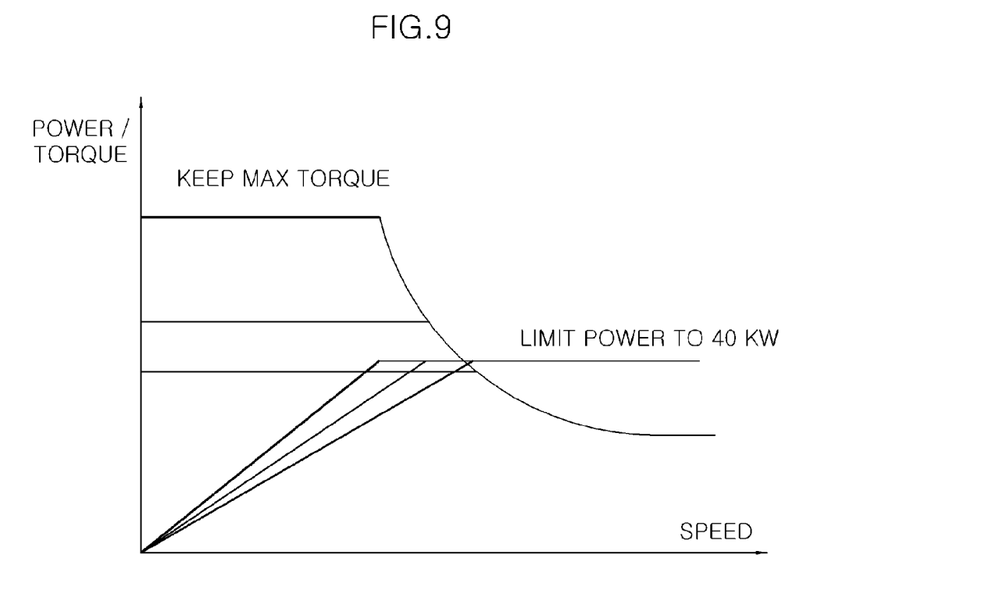

FIGS. 7 to 9 are graphs illustrating a concept of a voltage drop quantity using a maximum torque variable and a power limiting variable in accordance with an exemplary embodiment of the present inventive concept. FIG. 7 is a graph illustrating the relationship between power/torque and speed when the maximum allowable power is 60 kW, FIG. 8 is a graph illustrating the relationship between power/torque and speed when the maximum allowable power is 80 kW, and FIG. 9 is a graph illustrating the relationship between power/torque and speed when the maximum allowable power is 40 kW. In other words, the lower the maximum power limit, the smoother the slope. This means that as the arrival time to the maximum power is increased, the reference voltage is increased.

Figure 10:
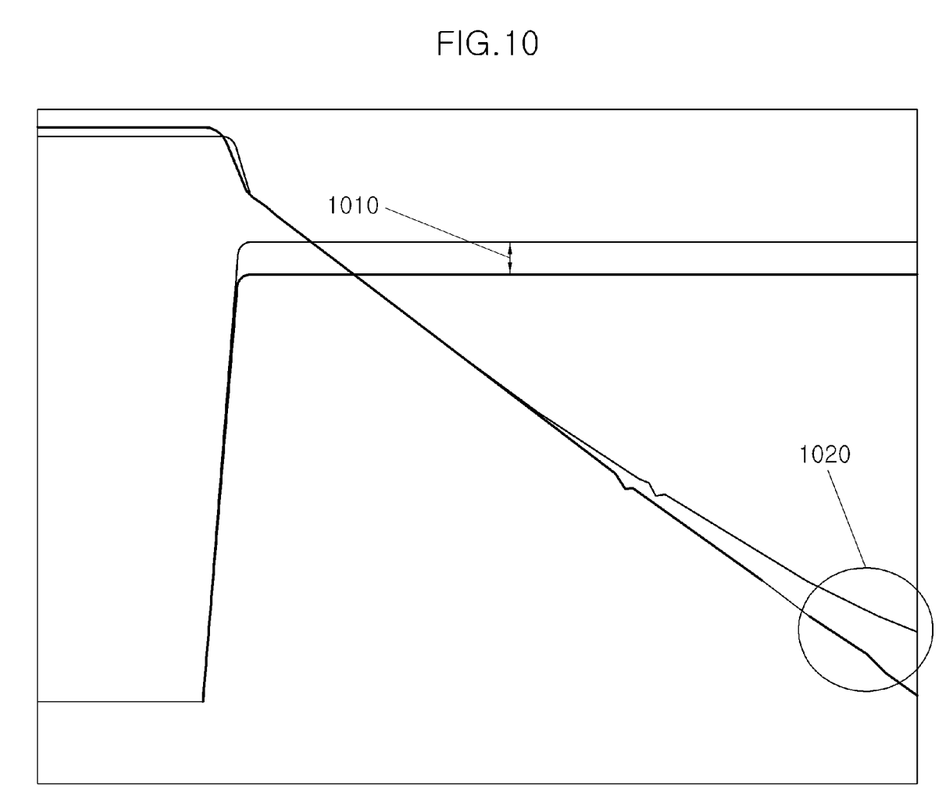
FIG. 10 is a graph illustrating a change in voltage drop quantity depending on a change in torque in accordance with an exemplary embodiment of the present inventive concept.

FIG. 10 is a graph illustrating a change in voltage drop quantity depending on a change in torque in accordance with an exemplary embodiment of the present inventive concept. Referring to FIG. 10, the change 1020 in the voltage drop quantity occurs in response to the change 1010 in the torque quantity. Therefore, the voltage drop quantity may be controlled by changing the maximum torque quantity and the output maximum power may also be increased.

In accordance with the exemplary embodiments of the present inventive concept, it is possible to stabilizing the voltage of the battery by controlling the minimum voltage of the battery based on the test of the low temperature and the low SOC.

Further, it is possible to stabilize the voltage of the battery by increasing an arrival time of the voltage of the battery to the maximum possible power of the battery by controlling the torque of the maximum motor at the low temperature and the low SOC.

While the present inventive concept has been described with respect to the specific embodiments, it will be apparent to those skilled in the art that various changes and modifications may be made without departing from the spirit and scope of the invention as defined in the following claims.

What is claimed is:

1. An apparatus for alleviating a voltage drop of a battery cell, comprising:
    a battery having a plurality of battery cells;
    a sensor sensing the battery to generate sensing information;
    a calculator calculating an allowable torque of a motor using the sensing information and calculating an expected voltage of the battery using the allowable torque and the sensing information; and
    a determinator configured to control a torque quantity of the motor using the expected voltage and a preset reference voltage,
    wherein the reference voltage is increased by an extension of arrival time of the reference voltage to the maximum allowable power, and wherein the determinator reduces the torque quantity of the motor when the expected voltage is smaller than the reference voltage and uses the torque quantity corresponding to the maximum allowable power when the expected voltage is higher than the reference voltage.

2. The apparatus of claim 1, wherein the calculator calculates the expected voltage using maximum allowable power of the battery, an allowable torque within a range of the maximum allowable power, a current voltage slope, and a change quantity of revolution per minute (RPM) of the motor.

3. The apparatus of claim 2, wherein the current voltage slope is calculated by a power usage of the battery at a position of a current voltage.

4. The apparatus of claim 2, wherein the change of quantity of the RPM is a change of quantity of RPM to the maximum allowable power at a current point.

5. The apparatus of claim 2, wherein the expected voltage is calculated by the following Equation:

Expected Voltage=Current Voltage−$Dv/d$ (RPM)× Change Quantity Of RPM

In the above Equation, dV/d (RPM) represents a voltage slope, dV represents previous voltage−current voltage and d (RPM) represents current RPM−previous RPM.

6. The apparatus of claim 1, wherein the sensing information includes a state of charge (SOC), a state of health (SOH), a temperature, and a voltage of the battery.

7. The apparatus of claim 1, wherein the maximum allowable power is any one of 60 kW limit, 80 kW limit, and 40 kW limit.

8. A method for alleviating a voltage drop of a battery cell, comprising:
    sensing a battery having a plurality of battery cells to generate sensing information;
    calculating an allowable torque of a motor using the sensing information;
    calculating an expected voltage of the battery using the allowable torque and the sensing information; and
    controlling a torque quantity of the motor using the expected voltage and a preset reference voltage,
    wherein the reference voltage is increased by an extension of arrival time of the reference voltage to the maximum allowable power and the controlling of the torque quantity includes the steps of:
    comparing the expected voltage with the reference voltage;
    reducing the torque quantity of the motor when the expected voltage is smaller than the reference voltage; and
    using the torque quantity corresponding to maximum allowable power when the expected voltage is higher than the reference voltage.

9. The method of claim 8, wherein the expected voltage is calculated using maximum allowable power of the battery, an allowable torque within a range of the maximum allowable power, a current voltage gradient, and a change quantity of revolution per minute (RPM) of the motor.

10. The method of claim 9, wherein the current voltage slope is calculated by a power usage of the battery at a position of a current voltage.

11. The method of claim 9, wherein the change quantity of the RPM is a change quantity of RPM to the maximum allowable power at a current point.

12. The method of claim 9, wherein the expected voltage is calculated by the following Equation:

Expected Voltage=Current Voltage−$Dv/d$ (RPM)× Change Quantity Of RPM

In the above Equation, dV/d (RPM) represents a voltage slope, dV represents previous voltage−current voltage and d (RPM) represents current RPM−previous RPM.

13. The method of claim 8, wherein the sensing information includes a state of charge (SOC), a state of health (SOH), a temperature, and a voltage of the battery.

14. The method of claim 8, wherein the maximum allowable power is any one of 60 kW limit, 80 kW limit, and 40 kW limit.

15. A non-transitory computer readable medium including instructions, which cause a controller to perform the steps in the method of claim 8.

* * * * *